United States Patent
Lee

(10) Patent No.: US 7,396,517 B2
(45) Date of Patent: Jul. 8, 2008

(54) REDUCTION OF NOX EMISSIONS USING A STAGED SILVER/ALUMINA CATALYST SYSTEM

(75) Inventor: Jong-Hwan Lee, Rochester Hills, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 419 days.

(21) Appl. No.: 11/198,092

(22) Filed: Aug. 5, 2005

(65) Prior Publication Data
US 2007/0031310 A1   Feb. 8, 2007

(51) Int. Cl.
*B01D 53/56* (2006.01)
*B01D 53/94* (2006.01)

(52) U.S. Cl. .............. 423/213.2; 423/213.7; 423/239.1; 423/239.2

(58) Field of Classification Search .............. 423/213.2, 423/213.7, 239.1, 239.2
See application file for complete search history.

(56) References Cited

U.S. PATENT DOCUMENTS

2003/0059357 A1* 3/2003 Tonkyn et al. .............. 423/235
2003/0180196 A1* 9/2003 Gillespie et al. ............ 422/168
2006/0112678 A1* 6/2006 Kaboord et al. .............. 60/274

FOREIGN PATENT DOCUMENTS

JP   09-103649 A   * 4/1997

OTHER PUBLICATIONS

Tatsuo Miyadera, Selective reduction of NOx by ethanol on catalysts composed of Ag/Al2O3 and Cu/TiO2 without . . . , Applied Catalysis B: Environmental 16 (1998), pp. 155-164.
Y. Yu, H. He, Q. Feng, H. Gao, X. Yang, Mechanism of the selective catalytic reduction of NOx by C2H5OH over . . . , Applied Catalysis B: Environmental 49 (2004), pp. 159-171.
L.-E Lindfors, K. Eranen, F. Klingstedt, D.Yu. Murzin, Silver/alumina catalyst for selective catalytic . . . , Topics in Catalysis vol. 28, Nos. 1-4, Apr. 2004, pp. 185-189.

* cited by examiner

*Primary Examiner*—Timothy C Vanoy

(57) ABSTRACT

The hydrocarbon-assisted, selective catalytic reduction of NOx constituents in lean-burn engine exhaust is benefited by passage of the exhaust over a staged catalyst bed comprising a first stage of an alumina-supported silver catalyst for oxidation of NO to $NO_2$ and partial oxidation of added hydrocarbon to an aldehyde. Downstream of the silver catalyst is a second catalyst selected for the reaction of hydrocarbon and aldehyde species with $NO_2$ to reduce it to nitrogen. Gamma-alumina and BaY zeolite are examples of suitable second stage catalysts.

16 Claims, 2 Drawing Sheets

REDUCTION OF NOX EMISSIONS USING A STAGED SILVER/ALUMINA CATALYST SYSTEM

TECHNICAL FIELD

This application pertains to the treatment of exhaust gas from lean-burn gasoline and diesel engines to convert nitrogen oxides (NOx) to nitrogen. More specifically, this invention pertains to hydrocarbon-assisted, selective catalytic reduction of nitrogen oxides in the oxygen-rich exhaust using a multistage catalytic reactor including an alumina-supported silver catalyst as the first stage for conversion of NO to $NO_2$ and partial oxidation of hydrocarbons, and a second stage catalyst for conversion of $NO_2$ to nitrogen.

BACKGROUND OF THE INVENTION

Lean-burn gasoline and diesel engines are operated at higher than stoichiometric air-to-fuel (A/F) mass ratios for improved fuel economy. They also provide good driving performance and reduced carbon dioxide emission compared with stoichiometric gasoline engines. Such lean-burn engines produce a hot exhaust with a relatively high content of oxygen and nitrogen oxides ($NO_x$). The temperature of the exhaust from a warmed up diesel engine is typically in the range of 200° to 400° C. and has a representative composition, by volume, of about 10-17% oxygen, 3% carbon dioxide, 0.1% carbon monoxide, 180 ppm hydrocarbons, 235 ppm $NO_x$, and the balance nitrogen and water. These $NO_x$ gases, typically comprising nitric oxide (NO) and nitrogen dioxide ($NO^2$), are difficult to reduce to nitrogen ($N^2$) because of the high oxygen ($O_2$) content and the water content in the hot exhaust stream.

Traditional three-way catalysts used with stoichiometric gasoline engines are not very effective for treating lean-burn exhaust. Researchers have attempted to find durable catalysts that can selectively reduce NOx using engine-out hydrocarbons (HC-SCR) despite the competing combustion reaction with the oxygen content of the exhaust. Such catalyst developments have not been successful because of poor activity, narrow operating temperature window and insufficient durability of candidate catalyst materials.

One of the technologies being considered for the lean-burn gasoline or diesel engine NOx emission control is to reduce NOx using selected fuel-component hydrocarbons added to the exhaust stream. The hydrocarbons are intended to provide chemical species for reduction of nitrogen oxides to nitrogen. In such hydrocarbon-assisted SCR, ethyl alcohol is viewed as having reductant-utility like a hydrocarbon because it can be converted in the exhaust to chemical species useful in the reduction of $NO_x$. Ethyl alcohol can be delivered as a fuel additive, and, if desired, easily distilled off from the fuel and stored in a separate tank on a vehicle.

In a refinement of this HC-SCR approach developed by the assignee of this invention, ambient air is passed through a non-thermal plasma generator to produce ozone which is also introduced into the exhaust stream for oxidation of NO to $NO_2$ which has been easier to convert to $N_2$. Ozone, together with oxygen in the exhaust promotes limited oxidation of the hydrocarbons to aldehydes and alcohols, preferably to compounds containing more than two carbon atoms. In plasma-assisted HC-SCR systems, partially oxidized HCs like aldehydes and alcohols (>C2) have been shown to be very effective in reducing NOx over a dual bed of BaY zeolite (upstream bed) and CuY zeolite (down stream) catalysts. However, a high NOx conversion efficiency can be obtained only with a large volume of such catalysts, which results in packaging problems and slow warm-up.

A catalyst consisting of finely divided particles of silver dispersed on high surface area gamma-alumina particles (Ag/$Al_2O_3$) has been shown to be moderately effective in reducing NOx with various, hydrocarbon species such as engine-out HCs, partially oxidized HCs and fuel-component HCs. The use of a non-noble metal catalyst is preferred for NOx conversion for a lower cost process. Further, Ag/$Al_2O_3$ can reduce NOx at higher space velocities than the base metal cation-exchanged zeolite catalysts. However, the use of the silver catalyst alone failed to convert all NO to $N_2$ and produced unwanted by-products in the exhaust.

It is, thus, an object of the present invention to provide an improved method of practicing hydrocarbon-assisted selective catalytic reduction in such oxygen-rich and nitrogen oxide-containing exhaust mixtures. It is a more specific object of the present invention to provide an improved method of utilizing silver catalysts in the practice of HC-SCR.

SUMMARY OF THE INVENTION

The exhaust of a lean-burn engine contains gaseous constituents, as stated above, and also particulate matter composed of carbon and incompletely burned hydrocarbons. The exhaust may be passed through a suitable filter or oxidation reactor to reduce the content of particulates and incompletely burned gaseous hydrocarbons before being subjected to selective catalytic reduction of NOx constituents.

In hydrocarbon-assisted selective catalytic reduction of NO and $NO_2$ in lean-burn engine exhaust, a suitable fuel-component hydrocarbon(s) is added to the exhaust to provide reduction species for the NOx constituents. The hydrocarbon-assist material may, for example, be a gasoline fraction, or a low molecular weight fraction of diesel fuel, and/or an oxygenated hydrocarbon like a $C_1$ to $C_3$ alcohol, for example, ethanol. The hydrocarbon(s) is added in proportion to the nitrogen content of the exhaust. More hydrocarbon content is usually required at higher oxygen content and at higher exhaust or catalyst temperatures.

The exhaust, which may vary widely in temperature depending on engine operation, is then passed into contact with a selective reduction catalyst material. The catalyst will typically be used as washcoat layers applied to the cell walls of one or more ceramic (e.g., cordierite) monolith bricks. The space velocity of the exhaust through the cells of the monolith(s) is often in the range of about 25 k $h^{-1}$ to about 50 k $h^{-1}$.

Competing oxidation and reduction reactions can occur in the gas phase and on the catalyst particles. Hydrocarbons are fragmented into smaller alkane and alkene molecules and partially oxidized to alcohols and aldehydes. NO is oxidized to $NO_2$ and, desirably, NO and $NO_2$ are reduced to nitrogen. Some oxygen-containing and nitrogen-containing carbon compounds may be formed.

A catalyst comprising small particles of silver dispersed on larger particles, of high surface area, gamma-alumina (Ag/$Al_2O_3$) is effective, even at relatively low exhaust temperatures, to commence fragmentation of the hydrocarbon as reductant species and to commence conversion of NO to $NO_2$ and $N_2$. But the silver catalyst is best used in combination with a downstream secondary catalyst to advance the selective catalytic reduction of NOx constituents to nitrogen.

A second catalyst based, for example, on alumina or BaY zeolite is placed downstream of the Ag catalyst to facilitate the reaction of $NO_2$ and partially oxidized hydrocarbons, such as acetaldehyde. This downstream catalyst bed can be made of any material(s) that suitably facilitates the reaction between NOx and carbon and oxygen-containing reductant materials.

As the exhaust contacts the Ag catalyst bed at a relatively high space velocity, NO and hydrocarbons or $C^{2+}$ alcohols are rapidly converted into $NO_2$ and aldehydes. The exhaust then flows into contact with the second bed, composed, for example, of alumina or a suitable metal cation-exchanged Y zeolite where reduction of $NO_2$ to $N_2$ by acetaldehyde is completed.

If there is, a significant amount of ammonia or other nitrogen-containing species formed in the dual bed reactor that is not consumed, there in reducing $NO_2$, a third catalyst bed employing a known catalyst for $NH_3$ reduction of NOx (such as copper-exchanged ZSM zeolite or $Cu/TiO_2$) may be employed.

Thus, the staged hydrocarbon-assisted selective catalytic reduction system of this invention includes a first bed of silver catalyst (for example, a wash coating on the walls of a first monolith), a second bed with a catalyst for $NO_2$ reduction to nitrogen with aldehydes (for example, a wash coating on the walls of a second, downstream monolith), and an optional third bed comprising a catalyst for reduction of $NO_2$ with ammonia. This low cost, staged reactor system is effective over a wide range of exhaust temperatures to produce high conversion of NOx constituents, to nitrogen.

Other objects and advantages of the invention will become apparent from a detailed description of preferred embodiments which follows.

DESCRIPTION OF PREFERRED EMBODIMENTS

Figure 1:
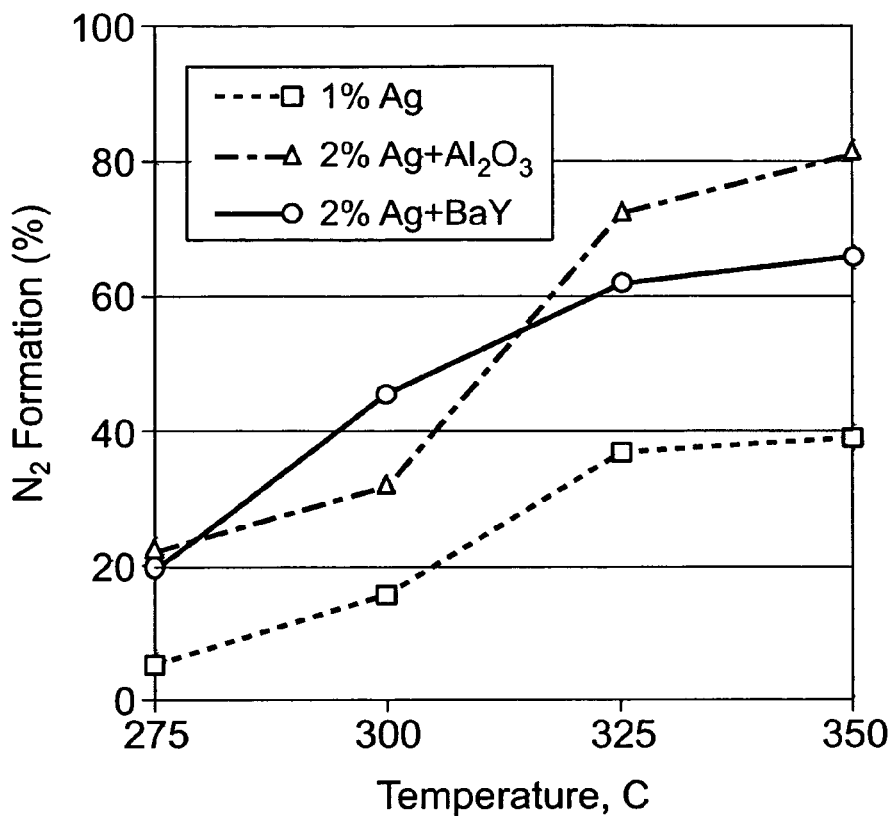
FIG. 1 is a graph of $N_2$ formation (%) from NO and $NO_2$ when a simulated lean-burn engine exhaust stream initially containing NO, with ethanol addition, is passed over staged $Ag/Al_2O_3$ catalyst bed configurations at a space velocity of 100 k $h^{-1}$ and at relatively low catalyst temperatures increasing over the range of 225° C. to 350° C.

Silver catalysts and exemplary second stage catalysts were prepared for use and testing in hydrocarbon-assisted selective catalytic reduction of simulated exhaust compositions from a lean-burn engine. In accordance with preferred embodiments of this invention, a dual bed catalytic reduction reactor was used with a silver catalyst as, the first-stage catalyst and a gamma-alumina catalyst or a BaY zeolite catalyst as second stage catalyst. The catalysts used in these examples were prepared as follows.

Catalyst Preparation and Characterization.

$Ag/Al_2O_3$ containing 1.0 and 2.0 wt. % Ag were prepared on a commercial $\gamma$-$Al_2O_3$ powder (Sasol, Catalox SBa-200, surface area =200 $m^2$/g) by an incipient wetness method using $AgNO_3$ (JT Baker) as a precursor. The catalysts were dried at 110° C. overnight and calcined at 500° C. for 4 h. The Sasol's $\gamma$-$Al_2O_3$ powder contains 98+ % $Al_2O_3$ with low levels of impurities (e.g., $Na_2O$, $TiO_2$, and $SiO_2$), and was calcined at 550° C. for 4 h prior to the use.

BaY containing 17.0 wt. % Ba was prepared from the NaY extrudates (Zeolyst, CBV-100, 10 wt. % Na, Si/Al=5.1) by ion exchange using $Ba(NO_3)_2$ (JT Baker) as a precursor at room temperature for 24 hours. The sample was then dried at 120° C. for 4 h, and calcined at 550° C. for 4 hours. The ion exchange and calcination steps were repeated four times.

Cu-ZSM-5 containing 2.6 wt. % Cu was prepared from the $NH_4$-ZSM-5 powder (Tosoh, HSZ-830A, Si/Al =14) by the same ion exchange method using $Cu(NO_3)_2$ (Aldrich) as a precursor at room temperature for 24 h. The sample was then dried at 110° C. overnight and calcined at 450° C. for 4 h.

The concentrations of Ag, Ba, and Cu were determined by Inductively Coupled Plasma-Atomic Emission Spectroscopy.

Catalyst Evaluation

All of the following experiments were conducted in a vertical micro reactor system with the feed gas flowing downward. Catalyst samples of 60-80 mesh sizes were loaded in a ⅜" OD quartz tube, which was then housed in an electric furnace. The reaction temperature was measured by a thermocouple located slightly above the catalyst bed in the inlet. Unless specified otherwise, the activity was measured using a feed gas containing 500 ppm NO, 15% $O_2$, 10% $H_2O$ and balance He. Either ~1200 ppm $C_2H_5OH$ or ~400 ppm n-$C_8H_{18}$ was used as hydrocarbon reductant. The $C_1$/N ratio was calculated to be 4.8 for ethanol and 6.4 for n-octane. Pure water and liquid hydrocarbons were injected in the same manner using separate sets of a syringe pump and a wick. The injected liquids were then evaporated and heated along, with the gas lines to over 120° C. The total gas flow rate was fixed at 272 ml/min (STP), and the gas hourly space velocity was varied by using different catalyst amounts. The pressure inside the system was regulated at 940 Torr, and all the gas flow was directed to the analytical instruments. The concentrations of reactants and products were measured by a Nicolet Nexus 670 infrared spectrometer (FT-IR), and an Agilent 6890 gas chromatographer with an Agilent 5973 mass spectrometer (GC-MC), when needed.

The catalysts were evaluated for their activity toward hydrocarbon (HC) conversion, NOx conversion, NO oxidation, and $N_2$ formation. The HC conversion and NOx conversion are calculated based on the difference in their concentrations measured before and after the catalyst. On the other hand, NO oxidation is defined as the conversion of NO to $NO_2$, while $N_2$ formation is defined as the conversion of NOx to $N_2$ only.

% HC Conversion=[HC(in)−HC(out)]/HC(in)×100

% $N_2$ Formation=[$N_2$(out)×2]/[NO(in)+$NO_2$(in)]×100

Samples of $Ag/Al_2O_3$ were tested as a NOx reduction catalyst in simulated lean-burn exhaust mixtures. As described above the simulated feed gas stream consisted by volume of 500 ppm NO, 15% $O_2$, 10% $H_2O$ and balance He. Either ~1200 ppm $C_2H_5OH$ or ~400 ppm n-$C_8H_{18}$ was used as hydrocarbon reductant. It was found that the silver catalyst performed well, even at low exhaust temperatures, to promote the oxidation of NO to $NO_2$ and the oxidation of ethanol and n-octane to acetaldehyde. In accordance with this invention, catalysts promoting the reduction of $NO_2$ to $N_2$ by reaction of $NO_2$ with the aldehydes and hydrocarbons were used and evaluated in combination with the silver catalyst. Tests were conducted to assess the performance of staged catalytic reduction reactors for NOx in which $Ag/Al_2O_3$ was used in the first catalyst bed and alumina or BaY zeolite catalysts were used in a second, downstream bed.

EXAMPLE 1

Three different catalyst layouts, which contained the same amount of Ag and either $Al_2O_3$ or BaY, were prepared: (A) 0.12 g of 1 wt. % $Ag/Al_2O_3$, (B) 0.06 g of 2 wt. % $Ag/Al_2O_3$ followed by 0.06 g of $Al_2O_3$, (C) 0.06 g of 2 wt. % $Ag/Al_2O_3$ followed by 0.048 g of BaY. The amounts of catalysts were selected so the space velocity of the gas, was at 100 k $h^{-1}$ for each catalyst bed (in this case of a quartz tube packed with catalyst powder). In this, first series of experiments, 1200 ppm ethanol was added to the gas stream (500-ppm NO, 15% $O_2$, 10% $H_2O_2$He) as the "hydrocarbon" additive. The tests were conducted with the catalyst layouts at temperatures of 275° C., 300° C., 325° C., and 350° C., respectively.

During the reduction of NO by ethanol at 100 k $h^{-1}$, similar % ethanol conversion was obtained for all three layouts. Ethanol conversion lit off slightly faster with the layered catalyst configurations (i.e., Layouts B and C) as Ag particles were concentrated in the front part of the catalyst bed, although the Ag amount was same for all three layouts. As seen in FIG. 1, the $N_2$ formation was significantly improved with the layered configurations including $Al_2O_3$ and BaY as alternative second stage catalysts. NOx reduction performance was improved two-fold at all temperatures over the staged catalysts. On the other hand, the silver catalyst alone promoted the conversion of only about 40% of NO and $NO_2$.

By-products such as ammonia, acetaldehyde and hydrogen cyanide may be formed over the catalysts and detected in the catalytic reactor outlet. There were also considerable differences in product distributions of ammonia, acetaldehyde, and hydrogen cyanide using the silver catalyst or silver combined with one of alumina or BaY. HCN disappeared more easily with increasing temperature over the staged catalysts. Also, more $NH_3$ was produced over Layout B. At higher temperatures (425° C. to 500° C.) essentially the same % $N_2$ formation was obtained regardless of the catalyst layouts, probably because only the front part of the catalyst bed (the $Ag/Al_2O_3$) was used with increasing temperature.

EXAMPLE 2

The reduction of NO by n-octane addition to the exhaust was conducted for the following catalysts: (A) 0.06 g of 2 wt. % $Ag/Al_2O_3$ (200 k $h^{-1}$), (B) 0.06 g of 2 wt. % $Ag/Al_2O_3$ followed by 0.06 g of $Al_2O_3$ (100 k $h^{-1}$), (C) 0.06 g of 2 wt. % $Ag/Al_2O_3$ (100 k $h^{-1}$) followed by 0.048 g of BaY. When the silver catalyst was used alone (A), an amount was provided for a higher space velocity (i.e., 200 k $h^{-1}$) because the light-off temperature for n-octane was, found to be too low with the 1 wt. % Ag catalyst to obtain a fair comparison with the staged catalysts (B) & (C).

Figure 2:
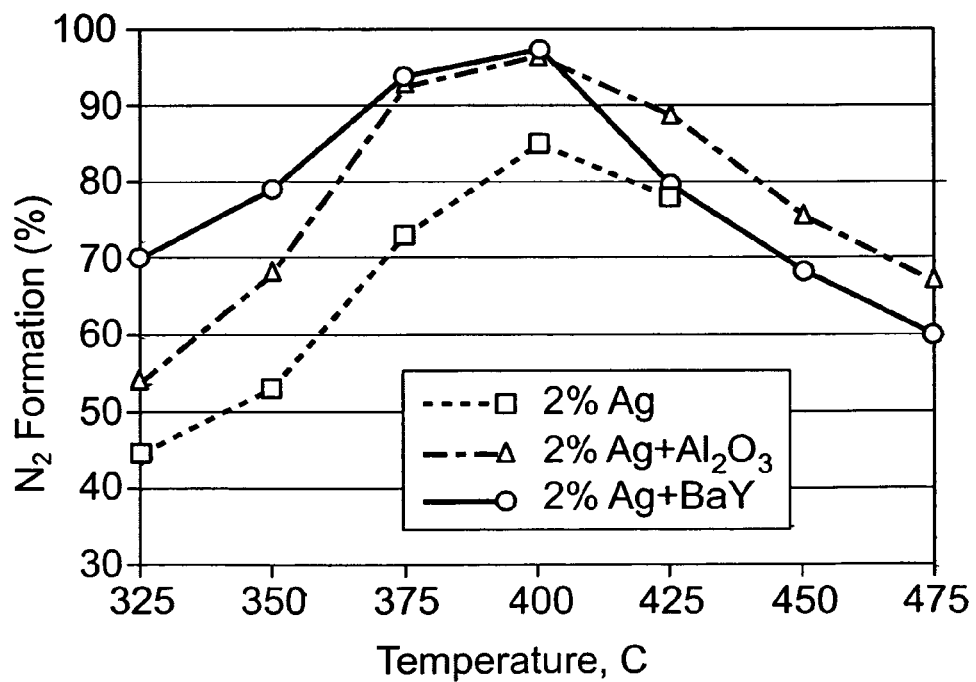
FIG. 2 is, a graph of $N_2$ formation (%) from NO and $NO_2$ when a simulated lean-burn engine exhaust stream initially containing NO, with normal-octane addition, is passed over staged $Ag/Al_2O_3$ catalyst bed configurations at a space velocity of 100 k $h^{-1}$ and at relatively low catalyst temperatures increasing over the range of 225° C. to 350° C.

The n-octane conversion reaction lit off at similar temperatures over catalysts A and B as the same amount of Ag was used in the front part of the catalysts. However, as seen in FIG. 2, the % $N_2$ formation was significantly improved over when additional $Al_2O_3$ was placed downstream of the Ag catalyst (i.e., Layout B). Interestingly, neither $NH_3$ nor HCN were observed with the additional $Al_2O_3$. On the other hand, the light-off temperatures were lowered by ~50° C., and higher NOx reduction levels were obtained over Layout C at temperatures below 400° C. This improvement in NOx reduction performance with BaY may be explained by the fact that BaY can also reduce NOx by itself at lower temperatures; i.e., BaY does more than the role of a secondary catalyst suggested in the bi-functional mechanism.

EXAMPLE 3

$Ag/Al_2O_3$+Variable Amount of $Al_2O_3$

It is expected that there would be an optimum ratio between the amounts of $Ag/Al_2O_3$ and a secondary catalyst. So, the effect of $Al_2O_3$ amount was examined by using two different amounts of $Al_2O_3$ (0.06 g and 1.5×0.06 g), while keeping the amount of 2 wt. % $Ag/Al_2O_3$ fixed at 0.06 g (i.e., 200 k $h^{-1}$). During the NO reduction by ethanol, the increase in $Al_2O_3$ amount resulted in only slightly higher levels of NOx conversion and $N_2$ formation at 275-350° C., and the same conversion levels at 425-500° C. For the NO reduction by n-octane, practically the same conversion levels were obtained at all temperatures, indicating the diminishing return of using additional $Al_2O_3$ in the layered configuration.

EXAMPLE 4

$Ag/Al_2O_3$+Variable Amount of BaY

The effect of BaY amount was examined by using three different amounts of BaY (0.048 g, 0.7×0.048 g, and 1.5× 0.048 g, while keeping the amount of 2 wt. % $Ag/Al_2O_3$ fixed at 0.06 g (i.e., 200 k $h^{-1}$). During the NO reduction by ethanol the increase in BaY amount resulted in higher conversions of ethanol and NOx at lower temperatures, while lowering NOx conversion at higher temperatures. Interestingly, more $NH_3$ was produced, while more acetaldehyde was consumed with increasing BaY amount: e.g., 115 ppm $NH_3$ and 0 ppm acetaldehyde at 350° C. and 1.5×200 k $h^{31\ 1}$. That is, BaY produces $NH_3$, but consumes acetaldehyde, which can inhibit the NOx reduction by $NH_3$. This offers another opportunity of improving NOx reduction performance at lower temperatures, by placing an $NH_3$-SCR catalyst (e.g., Cu/ZSM-5) at the downstream of BaY. However, during the NO reduction by n-octane, very little $NH_3$ was produced at all temperatures.

EXAMPLE 5

Mixing vs. Staging of Catalysts

Figure 3:
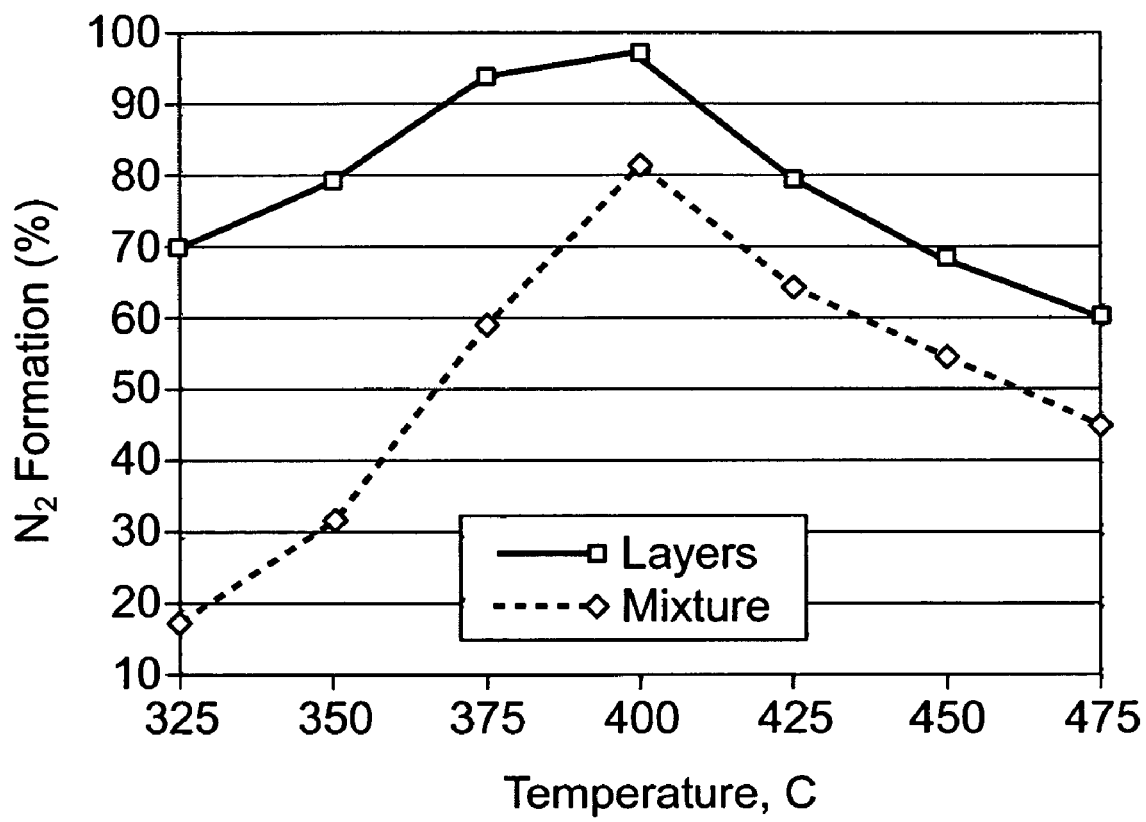
FIG. 3 is a graph of $N_2$ formation (%) from NO and $NO_2$ when a simulated lean-burn engine exhaust stream initially containing NO, with normal-octane addition, is-passed over staged $Ag/Al^2O_3$+BaY catalyst bed configurations, versus their physical mixture, at a space velocity of 100 k $h^{-1}$ and at catalyst temperatures increasing over the range of 325° C. to 475° C.

A physical mixture of 0.06 g of 2 wt. % $Ag/Al_2O_3$ and 0.048 g of BaY (i.e., 200 k $h^{-1}$ each) was prepared for a comparison with the upstream-downstream staged arrangement of the same two catalysts. The respective catalyst arrangements were tested for the NO reduction by n-octane. Comparative data for the mixture and staged arrangements are presented in FIG. 3. NOx reduction was suppressed greatly over the physical mixture at all temperatures. This can be attributed to the combustion of oxygenated hydrocarbon species, which is produced at the front part of the catalyst bed, by Ag particles in the latter part of the catalyst bed. This mixture can be considered as the case of $Ag/Al_2O_3$ modified by BaY additive, and thus suggests the advantage of using this staged system over using additives in improving NOx reduction performance of $Ag/Al_2O_3$.

Multi-Staged SCR Catalyst System

The two-stage Ag catalyst system can be expanded with the addition of $NH_3$-SCR catalyst as more $NH_3$ is produced with increasing temperature. In fact, when $NH_3$, $CH_3CN$, HCN, CO and $CH_3CHO$ were found to form during the NOx reduction by ethanol, a three-component composite catalyst, $Ag/Al_2O_3+CuSO_4/TiO_4+Pt/TiO_2$, was prepared to remove the unwanted harmful byproducts. Although this attempt did remove these byproducts, it did not result in improved $N_2$ formation, probably because the NOx reduction by $NH_3$ over the Cu catalyst in the center was poisoned by aldehydes, and/or because useful oxygenated hydrocarbon species were wasted by combustion over the catalysts downstream of Ag. However, since acetaldehyde is removed and more $NH_3$ is produced by BaY and $Al_2O_3$, additional $N_2$ formation is expected from the addition of an $NH_3$-SCR catalyst behind the layered catalyst configurations discussed in this study.

As illustrated in the above examples, the reaction mechanism of reducing NOx with hydrocarbons over $Ag/Al_2O_3$ has been examined using ethanol and n-octane as, the representative hydrocarbon reductants. The results obtained in this work suggest that the partial oxidation of hydrocarbons and the oxidation of NO are the initial reaction steps during the NOx reduction by hydrocarbons, over $Ag/Al_2O_3$. Ethanol can also be converted to aldehydes in the gas phase (without catalysts) with increasing temperature. N-octane starts to break up and become oxidized to form various smaller hydrocarbons, including, oxygenated species. This hydrocarbon oxidation reaction occurs more effectively over the front part of the $Ag/Al_2O_3$ catalyst bed, where NO is also oxidized effectively to $NO_2$ in the presence of reductants like hydrocarbons and $H_2$. But, the formation of $N_2$ from these more reactive species may occur over the remaining portion of the body of catalyst material, probably over the $Al_2O_3$ sites.

These observations and additional experiments with different amounts of $Al_2O_3$ placed downstream of the $Ag/Al_2O_3$ catalyst suggest that the NO reduction by hydrocarbons over $Ag/Al_2O_3$ may occur via a bi-functional reaction mechanism; NO and hydrocarbons are converted into $NO_2$ and more reactive hydrocarbon species (i.e., smaller alkenes, oxygenated hydrocarbons); respectively, over the Ag sites, and $N_2$ is produced from the subsequent reactions between these intermediate species over different sites including $Al_2O_3$.

As demonstrated in the above examples, the proposed bi-functional reaction mechanism offers an opportunity to improve the overall NOx reduction performance of $Ag/Al_2O_3$ by optimizing individual reaction steps separately. The concept of staged catalyst system with $Al_2O_3$ or BaY placed behind the Ag catalyst has been demonstrated to improve the NOx reduction to $N_2$ by ethanol and n-octane at lower temperatures. Other second stage or downstream catalysts may be used. For example, other alkaline earth metal cation-exchanged Y zeolites are suitable. Or alkali metal cation-exchanged, Y zeolites such as Na-, K-, Li-exchanged Y zeolites are suitable.

In practice, the silver and other catalysts are applied as a washcoat on the cell walls of a monolith(s). Different catalyst formulations can be washcoated on different monolith bricks, and used in series flow arrangement (e.g., Ag catalyst coated brick followed by a BaY coated catalyst brick). Or, different catalyst formulations can be washcoated on a single monolith brick as different layers (e.g., BaY applied as the bottom layer and Ag applied as the top layer on the cell walls of the monolith).

The staged silver-containing catalyst system of this invention is useful in hydrocarbon-assisted selective catalytic reduction of NOx with or without the use of a plasma addition to the exhaust of the lean-burn engine.

Accordingly, while the invention has been illustrated in terms of some preferred embodiments, it is to be understood that these embodiments are illustrative and not limiting of the scope of the invention.

The invention claimed is:

1. A method of converting $NO_x$ content of the exhaust gas of a lean-burn engine to nitrogen where the exhaust gas comprises NO and $NO_2$, the method comprising:
   adding a fuel-component hydrocarbon and/or a $C_1$ to $C_3$ alcohol to the exhaust gas; and
   passing the exhaust through a catalytic reactor comprising an upstream stage of a catalyst consisting essentially of silver supported on alumina and an adjacent, but separate, downstream stage of a catalyst for reduction of $NO_2$ to nitrogen, the silver supported on alumina promoting the oxidation of NO to $NO_2$ and the oxidation of hydrocarbon or alcohol to partially oxidized species.

2. A method as recited in claim 1 in which the downstream stage consists essentially of particles of alumina.

3. A method as recited in claim 1 in which the downstream stage consists essentially of particles of an alkali metal cation-exchanged Y zeolite or alkaline earth metal cation-exchanged Y zeolite.

4. A method as recited in claim 1 in which the downstream stage consists essentially of particles of sodium-exchanged Y zeolite or barium-exchanged Y zeolite.

5. A method as recited in claim 1 in which the exhaust is at a temperature in the range of 200° C. to 500° C.

6. A method of converting $NO_x$ content of the exhaust gas of a lean-burn engine to nitrogen where the exhaust gas comprises NO and $NO_2$, the method comprising:
   adding a fuel-component hydrocarbon and/or a $C_1$ to $C_3$ alcohol to the exhaust gas;
   passing the exhaust into contact with an upstream stage of a catalyst consisting essentially of silver supported on alumina to oxidize NO to $NO_2$ and to oxidize the hydrocarbon or alcohol to partially oxidized species comprising aldehyde species; and then
   passing the exhaust into contact with an adjacent, but separate, downstream stage of a catalyst for the reaction of the partially oxidized species with $NO_2$ to reduce the $NO_2$ to nitrogen.

7. A method as recited in claim 6 in which the downstream stage consists essentially of particles of alumina.

8. A method as recited in claim 6 in which the downstream stage consists essentially of particles of alkali metal cation-exchanged Y zeolite or alkaline earth metal cation-exchanged Y zeolite.

9. A method as recited in claim 6 in which the downstream stage consists essentially of particles of sodium-exchanged Y zeolite or barium-exchanged Y zeolite.

10. A method as recited in claim 6 in which the exhaust is at a temperature in the range of 200° C. to 500° C.

11. A method as recited in claim 6 in which the silver-on-alumina catalyst is in a washcoat applied to the cell walls of a first ceramic monolith and the catalyst for the reaction of aldehyde species with $NO_2$ is in a washcoat applied to the cell walls of a second ceramic monolith.

12. A method of converting $NO_x$ content of the exhaust gas of a lean-burn engine to nitrogen where the exhaust gas comprises NO and $NO_2$, the method comprising:
   adding a fuel-component hydrocarbon and/or a $C_1$ to $C_3$ alcohol to the exhaust gas;
   passing the exhaust into contact with a first catalyst consisting essentially of silver supported on alumina to oxidize NO to $NO_2$ and to oxidize the hydrocarbon or alcohol to partially oxidized species comprising aldehyde species; and passing the exhaust into contact with a second catalyst for the reaction of the partially oxidized species with $NO_2$ to reduce the $NO_2$ to nitrogen, wherein the second catalyst is in a first washcoat layer applied to the cell walls of a ceramic monolith and the first catalyst is in an upper washcoat layer applied to the first washcoat layer.

13. A method as recited in claim 12 in which the second catalyst consists essentially of particles of alumina.

14. A method as recited in claim 12 in which the second catalyst consists essentially of particles of alkali metal cation-exchanged Y zeolite or alkaline earth metal cation-exchanged Y zeolite.

15. A method as recited in claim 12 in which the second catalyst consists essentially of particles of sodium-exchanged Y zeolite or barium-exchanged Y zeolite.

16. A method as recited in claim 12 in which the exhaust is at a temperature in the range of 200° C. to 500° C.

* * * * *